(12) United States Patent
Buck, Jr.

(10) Patent No.: US 10,290,114 B1
(45) Date of Patent: May 14, 2019

(54) THREE-DIMENSIONAL OPTICAL APERTURE SYNTHESIS

(71) Applicant: LOCKHEED MARTIN COHERENT TECHNOLOGIES, INC., Louisville, CO (US)

(72) Inventor: Joseph Robert Buck, Jr., Superior, CO (US)

(73) Assignee: Lockheed Martin Coherent Technologies, Inc., Louisville, CO (US)

( * ) Notice: Subject to any disclaimer, the term of this patent is extended or adjusted under 35 U.S.C. 154(b) by 0 days.

(21) Appl. No.: 15/914,986

(22) Filed: Mar. 7, 2018

Related U.S. Application Data (60) Provisional application No. 62/480,332, filed on Mar. 31, 2017.

(51) Int. Cl.
| | |
|---|---|
| *H04N 13/275* | (2018.01) |
| *G06T 7/60* | (2017.01) |
| *G01S 5/16* | (2006.01) |
| *H01S 3/11* | (2006.01) |
| *H04N 5/66* | (2006.01) |
| *G01B 11/22* | (2006.01) |

(52) U.S. Cl.
CPC .............. *G06T 7/60* (2013.01); *G01B 11/22* (2013.01); *G01S 5/16* (2013.01); *H01S 3/11* (2013.01); *H04N 5/66* (2013.01); *H04N 13/275* (2018.05)

(58) Field of Classification Search
CPC .......... G06T 7/60; H04N 13/275; G01B 11/22
USPC .......................................................... 348/43
See application file for complete search history.

(56) References Cited

U.S. PATENT DOCUMENTS

2015/0332463 A1* 11/2015 Galera ............... G06K 9/00771
382/103

* cited by examiner

*Primary Examiner* — Nguyen T Truong
(74) *Attorney, Agent, or Firm* — Morgan, Lewis & Bockius LLP (57) ABSTRACT

An imaging system includes an imaging platform that has a first aperture and a second aperture that are separated by a separation distance in a predefined direction. The imaging system includes a transmitter device coupled to the first aperture that transmits an optical signal via the first aperture in a first direction perpendicular to the predefined direction. A first receiver of the imaging system receives, via the first aperture, a first reflected signal in the first direction from a target object at a range distance. A second receiver of the imaging system receives, via the second aperture, a second reflected signal in the first direction from the target object. A processor unit of the imaging system determines a phase difference between the first and second reflected signals. The processor unit also determines an estimate of a height of the target object based on the phase difference and the range distance.

20 Claims, 7 Drawing Sheets

THREE-DIMENSIONAL OPTICAL APERTURE SYNTHESIS

CROSS-REFERENCE TO RELATED APPLICATIONS

This application claims the benefit of priority under 35 U.S.C. § 119 from U.S. Provisional Patent Application 62/480,332 filed Mar. 31, 2017, which is incorporated herein by reference in its entirety.

STATEMENT REGARDING FEDERALLY SPONSORED RESEARCH OR DEVELOPMENT

Not applicable

FIELD OF THE INVENTION

The present invention generally relates to imaging with a synthetic aperture and more particularly to three-dimensional imaging with a synthetic aperture.

BACKGROUND

Optical apertures are used for sending optical signals to a target object such as a landscape in a range direction. Reflected optical signals from the target object may be received by the optical aperture and may be used to create images of the target object. While sending the optical signals, an optical aperture may be moved in a cross-range direction and reflected optical signals from the target object may be gathered by the optical aperture. Optical aperture synthesis is a technique for improving the cross-range resolution by movement of the optical aperture and combining the reflected optical signals to create a synthetic aperture. The synthetic aperture may provide increased cross-range resolution compared to a cross-range resolution provided by the optical aperture alone.

By receiving and combining the reflected optical signals from the range direction, while moving the aperture in the cross-range direction, two-dimensional images of range and cross-range can be created. Two-dimensional imaging can be extended to three-dimensional imaging by acquiring reflected signals in a third direction perpendicular to the range and cross-range directions. In view of the foregoing, creating resolutions in the third direction comparable to range and cross-range resolutions is desirable for three-dimensional imaging.

SUMMARY

According to various aspects of the subject technology, an imaging system is described. In some embodiments, the imaging system includes an imaging platform that includes two or more apertures. The two or more apertures include a first aperture and a second aperture. The first and second apertures are separated by a separation distance in a predefined direction. The imaging system includes a transmitter device that is coupled to the first aperture. The transmitter device may transmit an optical signal via the first aperture in a first direction perpendicular to the predefined direction. The imaging system also includes a first receiver and a second receiver device. The first receiver device may be coupled to the first aperture to receive a first reflected signal in the first direction, via the first aperture, from a target object at a range distance. The second receiver device may be coupled to the second aperture to receive a second reflected signal in the first direction, via the second aperture, from the target object. The first and second reflected signal may be based on the transmitted optical signal. The imaging system further includes a processor unit that may determine a phase difference between the received first reflected signal and the received second reflected signal. The processor unit may further determine an estimate of a height of the target object in the predefined direction. The height may be determined based on the phase difference and the range distance.

According to various aspects of the subject technology, a method of imaging is described. In some embodiments, the method includes moving an imaging platform in a first direction and at a range distance from a target object. The imaging platform may include two or more apertures. The first direction may be perpendicular to a second direction connecting the imaging platform to the target object. The imaging platform may include a first aperture and a second aperture that are separated by a separation distance in a third direction perpendicular to the first and second directions. The method includes transmitting an optical signal through the first aperture in the second direction to illuminate the target object. The method also includes detecting a first reflected signal based on the transmitted optical signal and detecting a second reflected signal based on the transmitted optical signal. The first reflected signal may be received from the target object through the first aperture. The second reflected signal may be received from the target object through the second aperture. The method further includes determining a phase difference between the first reflected signal and the second reflected signal and determining an estimate of a height of the target object in the third direction. The height may be determined based on the phase difference and the range distance.

According to various aspects of the subject technology, a method of imaging is described. In some embodiments, the method includes detecting a first portion of an optical signal reflected from an object. The first portion of the optical signal may be received through a first aperture. The method includes detecting a second portion of the optical signal reflected from the object. The second portion of the optical signal may be received through a second aperture. The first aperture and the second aperture may be arranged in an imaging platform. The optical signal may be received from a first direction connecting the object to the imaging platform. The first aperture and the second aperture may be separated by a separation distance in a second direction perpendicular to the first direction. The method also includes determining a phase difference between the detected first portion of the optical signal and the detected second portion of the optical signal. The method further includes determining an estimate of a height of the object in the second direction based on the phase difference.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

The present disclosure is directed, in part, to an imaging system with a synthetic aperture for capturing three-dimensional images. The imaging system can be installed on an airplane and can take images of a target object on the ground while flying at a range distance from the target object. The imaging system may include an imaging platform that includes two or more apertures, for example, a first aperture and a second aperture. A transmitter of the imaging system may generate an optical signal and the optical signal may be transmitted via the first aperture of the imaging platform to the target object. The optical signal is transmitted in a range direction from the imaging platform to the target object. A reflected signal which is a reflection of the transmitted optical signal that is transmitted back from the target object can be received by the first and second apertures of the imaging platform.

The imaging platform may be mounted on an aircraft and moved along a cross-range direction perpendicular to the range direction. While the imaging platform is moving, repeated optical signals, e.g., a train of optical pulses, are transmitted to the target object. The first and second apertures are separated by a predefined separation distance in a vertical direction perpendicular to the range and cross-range directions. The first and second apertures may receive the reflected signals in response to the transmitted optical signals. In some embodiments, the optical signal is a coherent optical signal such as a coherent laser pulse. Because the first and second apertures have the predefined separation distance in the vertical direction, the received coherent signals at the first and second apertures have a phase difference. The phase difference may be detected by a receiver of the imaging system and can be used as an indication of a vertical extent, e.g., a height, of the target object.

Therefore, by receiving the reflected signals by the first aperture while the imaging platform is moving in the cross-range direction, the imaging signal can create two-dimensional images in the range and cross-range directions. The movement of the imaging platform in the cross-range direction may create an effective extended aperture and thus provides a better resolution in the cross-range direction. Additionally, by receiving the reflected signals by the first and second apertures, the imaging system may resolve the vertical extent of the target object and may create a three-dimensional image.

Figure 1:
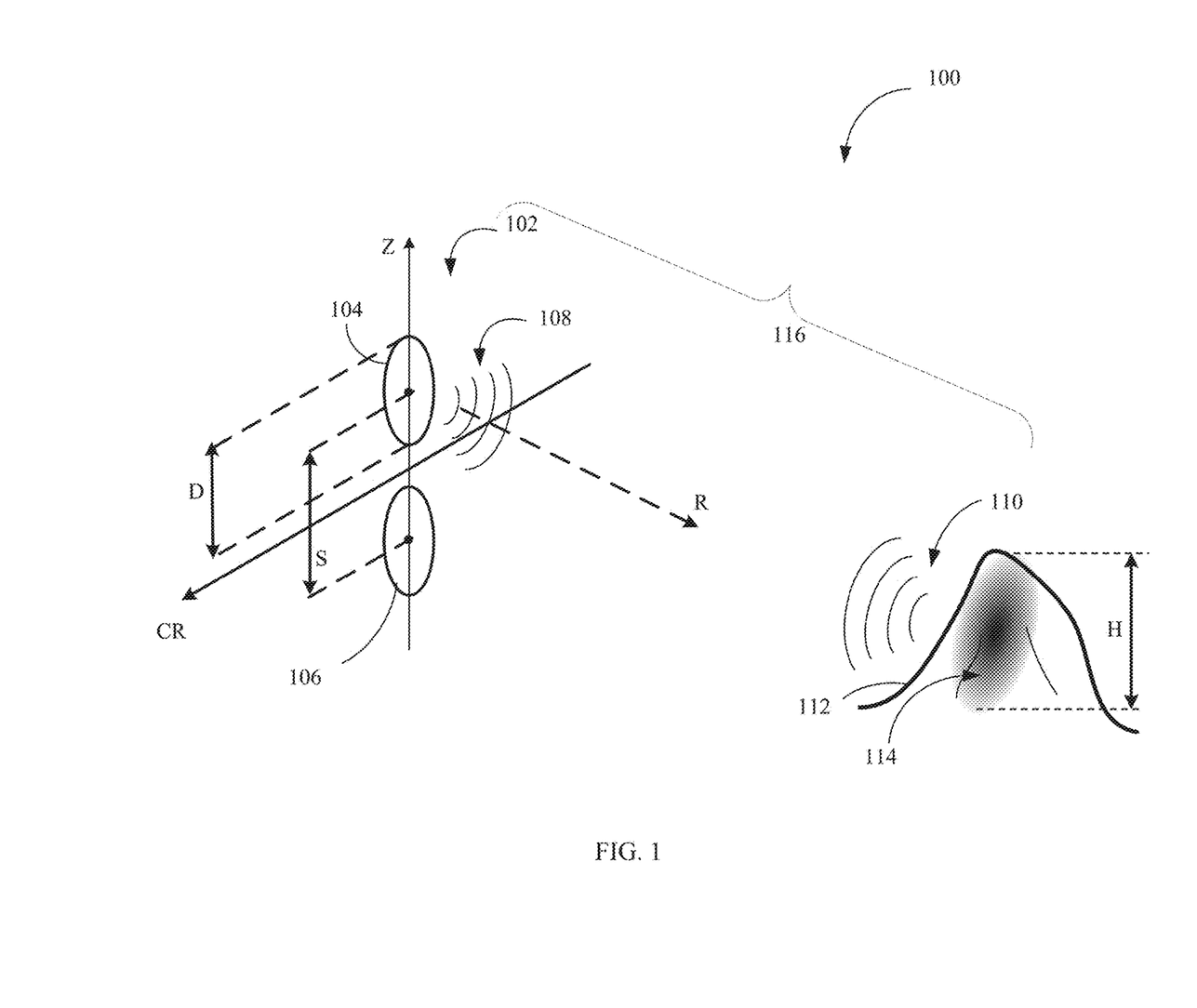
FIG. 1 illustrates a diagram of an example imaging configuration, according to some aspects of the disclosure.

FIG. 1 illustrates a diagram of an example imaging configuration, according to some aspects of the disclosure. Imaging configuration 100 includes imaging platform 102 positioned at range distance 116 along range direction, R, from target object 112. Imaging platform 102 includes circular apertures 104 and 106 with same diameter D that are positioned along Z direction perpendicular to R direction. In some embodiments, the centers of apertures 104 and 106 are separated by separation distance S. In some examples, at least one of apertures 104 and 106, e.g., aperture 104 transmits an electromagnetic signal such as optical signal 108 along range R to target object 112.

In some embodiments, transmitted optical signal 108 illuminates spot 114 of target object 112. In response to being illuminated by optical signal 108, target object 112 transmits reflected signal 110 back to imaging platform 102. Reflected signal 110 is received by apertures 104 and 106. As shown, illuminated spot 114 of target object 112 may have a circularly symmetric shape with height H. In some examples, imaging platform 102 is moved along CR direction that is perpendicular to R and Z directions.

Movement of imaging platform 102 is described in more details with respect to FIGS. 4A, 4B, 5A, 5B, and 5C. In some embodiments, aperture 104 and aperture 106 are planar apertures with different shapes and sizes. In some embodiments, imaging platform 102 includes two or more apertures such that one or more apertures transmit optical signal 108 and two or more apertures receive reflected signal 110. In some embodiments, an aperture may transmit optical signal 108 and/or may receive reflected signal 110. In some embodiments, imaging platform 102 includes two or more circular apertures and the aperture that transmits optical signal 108 may be under filled. The under filled transmitting aperture may create illumination spot 114 having an essentially Gaussian illumination pattern. In some embodiments, imaging platform 102 includes three or more apertures, e.g., six apertures, such that at least one aperture transmits optical signal 108 and at least two apertures receives reflected signal 110. In some examples, a phase profile of the at least one aperture that transmits optical signal 108 is stored and is used when processing the reflected signals. In some embodiments, transmitted optical signal 108 and reflected signal 110 are coherent optical signals such as coherent laser pulses. In addition, portions of reflected signal 110 that may go through the three or more apertures are coherent signals. In some embodiments, optical signal 108 is repeated optical pulses, e.g., a train of chirps that is transmitted while imaging platform moves along cross-range direction.

Figure 2:
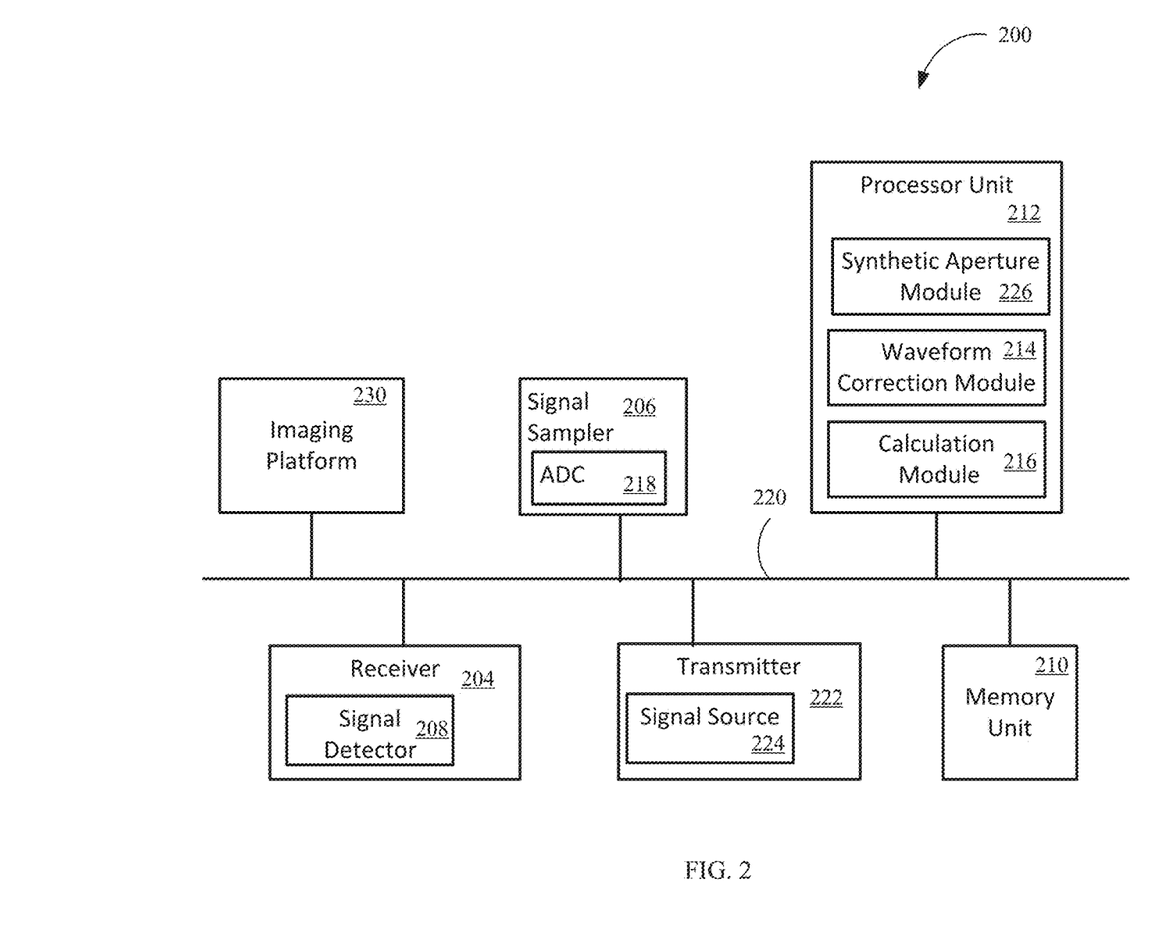
FIG. 2 illustrates a schematic diagram of an example imaging system, according to some aspects of the disclosure.

FIG. 2 illustrates a schematic diagram of an example imaging system, according to some aspects of the disclosure. Imaging system 200 includes a plurality of devices and modules that are coupled to each other through coupling bus 220. Coupling bus 220 may show different connections between device and modules of imaging system 200 that are optical connections and/or electrical connections. Imaging system 200 includes imaging platform 230 that is consistent with imaging platform 102 of FIG. 1. Imaging system 200 includes transmitter 222 which has signal source 224, e.g., a coherent source such as a laser source. Transmitter 222 may create optical signal 108 from signal source 224 and send optical signal 108 through coupling bus 220 to imaging platform 230 to be transmitted via aperture 104. In some embodiments, more than one transmitter 222 is coupled through bus 220 to imaging platform 230 such that each one of transmitters 222 transmits via a separate aperture. In some examples, transmitter 222 includes one or more transmitter devices that each one of transmitter devices may include a separate signal source.

Imaging system 200 also includes receiver 204 which includes signal detector 208, e.g., a light detector. Imaging platform 230 that is consistent with imaging platform 102 of FIG. 1 may receive reflected signal 110 via aperture 104 and/or aperture 106 and may send reflected signal 110 via coupling bus 220 to receiver 204. Receiver 204 may send the received reflected signal to signal detector 208 to generate a detected signal. In some embodiments, more than one receiver 204 is coupled through bus 220 to imaging platform 230 such that each one of receivers 204 receives reflected signal 110 via a separate aperture. In some examples, receiver 204 includes one or more receiver devices that each one of the receiver devices may include a separate signal detector. In some embodiments one or more receivers 204 and one or more transmitters 222 may be combined into a transceiver.

Imaging system 200 also includes memory unit 210 as well as processor unit 212. Processor unit 212 includes one or more processors. Imaging system 200 further includes signal sampler 206 that receives the detected signals from receiver 204 and generates sampled signals. In some examples, signal sampler 206 includes an analog to digital convertor (ADC) 218 that converts the sampled signals into digital data that can be stored in a piece of memory of memory unit 210. In some examples, receiver 204 includes signal sampler 206 and ADC 218 and thus receiver 204 may generate the digital data. In some embodiments, in addition to processor unit 212, other devices and modules of imaging system 200 may include one or more processors to perform communication, control, and processing tasks.

In some embodiments, a processor of processor unit 212 retrieves calculation module 216 from memory unit 210 and executes calculation module 216 on processor unit 212. Calculation module 216 either receives the digital data from signal sampler 206, or retrieves the digital data from memory unit 210 and determines, e.g., calculates a phase of the digital data. When the digital data is associated with received reflected signal 110 by aperture 104, the calculated phase is associated with received reflected signal 110 at aperture 104. When the digital data is associated with received reflected signal 110 by aperture 106, the calculated phase is associated with received reflected signal 110 at aperture 106.

In some examples, calculation module 216 determines phase difference P between calculated phases that are associated with received reflected signal 110 at apertures 104 and 106. In some embodiments, phase difference P can be modeled by equation (1) where k is a constant factor and lambda is a wavelength of transmitted optical signal 108. Referring to FIG. 1, H is a height of illuminated spot 114, S is a distance between the centers of apertures 104 and 106, and r is range distance 116 between imaging platform 102 and illuminated spot 114.

$$P = k \cdot \frac{2\pi SH}{lambda \cdot r} \qquad (1)$$

Therefore, in some embodiments, height H of illuminated spot 114 may be calculated based on phase difference P, wavelength lambda, distance r, and distance S as described above. In some examples, height H of illuminated spot 114 that is in Z direction is a difference between altitudes at a top to a bottom of illuminated spot 114 and thus height H is a relative altitude. In some examples, imaging system 200 scans an area that includes target object 112 and stores the relative altitudes in memory unit 210. Calculation module 216 may construct a three-dimensional map of the area based on the range and cross-range data and based on the stored relative altitudes of different target objects covering the area. Calculation module 216 may have a priori knowledge of an altitude of at least one point of the area and may construct the three-dimensional map based on the a priori knowledge. In some examples, calculation module 216 selects an altitude for at least one point in the area, e.g., selects altitude at the bottom of target object 112 to be zero. Then calculation module 216 constructs the three-dimensional map based on the selected altitude.

In some embodiments, signal sampler 206 is coupled to transmitter 222 and samples transmitted optical signal 108. Signal sampler further digitizes sampled optical signal 108 using ADC 218 and stores the digitized optical signal 108 in a memory unit 210. In some embodiments, processor unit 212 includes waveform correction module 214 that receives transmitted optical signal 108. In some examples, the waveform correction module 214 retrieves stored optical signal 108 from memory unit 210 and applies a correction based on optical signal 108 to received reflected signal 110 at apertures 104 and 106. In some examples, signal source has short coherence time, e.g., three microseconds, and by applying the correction the coherence time may be extended to a number of seconds, e.g., 10 seconds. As described, signal source 224 can be a laser source with a short coherence time such that after 3 micro seconds a phase of the laser signal may diverge. Applying a phase correction by waveform correction module 214 may extend a coherence time of reflected signal 110 and may improve accuracy of phase difference P.

In some examples, the phase correction is applied based on a round trip time. The round trip time is determined as the length of time from the instance optical signal 108 being transmitted until reflected signal 110 is received from the target object at range distance 116. Therefore, the phase correction may depend on range distance 116. In some embodiments, a phase divergence of the laser signal, e.g., a waveform error, may be tracked using an offset measurement technique to measure the offset with respect to a reference waveform. The waveform errors may be integrated to provide an error sum signal as a function of time and range. In some examples, pulse-to-pulse waveform errors are measured based on a fixed local oscillator.

In some embodiments, a processor of processor unit 212 retrieves synthetic aperture module 226 from memory unit 210 and executes synthetic aperture module 226. Synthetic aperture module 226 retrieves digital data associated with consecutive received reflected signals 110 at aperture 104 from memory unit 210. Synthetic aperture module 226 performs synthetic aperture processing on the retrieved digital data to create a synthetic aperture with an effective extended aperture diameter DeffD in CR direction and to increase the resolution in CR direction. Similarly, synthetic aperture module 226 may retrieve digital data associated with consecutive received reflected signals 110 at aperture 106 from memory unit 210. Synthetic aperture module 226 may perform synthetic aperture processing on the retrieved digital data to create a synthetic aperture with effective diameter DeffD in the CR direction and to increase the resolution in CR direction.

In some embodiments, calculation module 216, synthetic aperture module 226, and waveform correction module 214 are standalone modules with one or more processors and one or more memory units associated with each one of modules 216, 226, and 214.

In some embodiments as shown by equation (1), by increasing distance S between the centers of apertures 104 and 106, phase difference P is increased. In some embodiments, transmitting and receiving signals as well as detecting received signals involve electronic devices of imaging system 200 and thus noise is involved in the measurements. Increasing distance S may amplify phase difference P and may provide more certainty when determining, e.g., calculating, height H. Thus, increasing distance S between apertures 104 and 106 may increase phase difference P and thus may increase precision of height H.

In some examples, wavelength lambda is 1 micron, range distance 116 between imaging platform 102 and illuminated spot 114 is 50 km. Apertures 104 and 106 have diameter D equal to 5 cm and aperture separation distance S between apertures 104 and 106 is 50 cm. Then, assuming constant factor k equal to one, the phase difference for height H equal to 1 cm is 0.628 radians and for height H equal to 10 cm is 6.28 radians. Thus, phase wrapping would occur for heights H greater than 10 cm and ambiguity may arise for heights greater than 10 cm. In some embodiments, imaging platform 102 is modified such that separation distance S becomes 5 cm such that apertures 104 and 106 touch each other but do not overlap. For separation distance S equal to 5 cm, phase difference P for height H equal to 11 cm becomes 0.6908 with no wrapping of phase and no ambiguity. Therefore, the larger separation distance S provides higher precision of height H, while the smaller separation distance provides a way to mitigate the $2\pi$ phase ambiguities. In some embodiments, the $2\pi$ phase ambiguity may be resolved by assuming a connected surface and integrating the phase change from one location to the next location across a surface of target object 112.

Figure 3A:
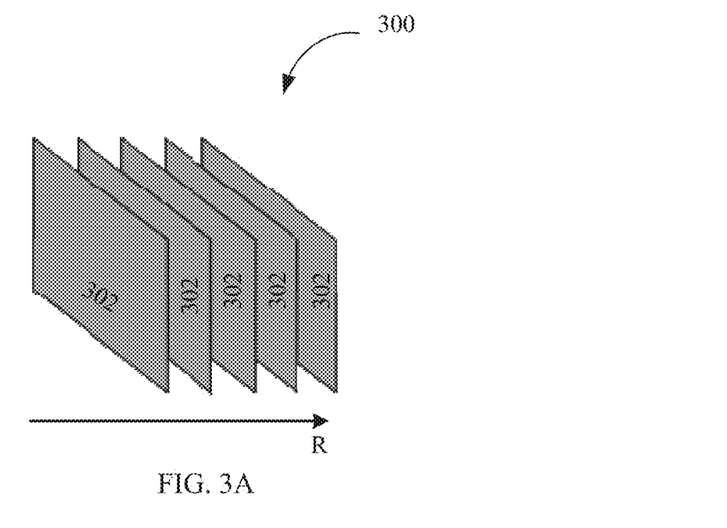
FIG. 3A illustrates a diagram of example illumination range slices generated by imaging system of FIG. 1, according to some aspects of the disclosure.

FIG. 3A illustrates a diagram of example illumination range slices generated by imaging system of FIG. 1, according to some aspects of the disclosure. Diagram 300 shows illumination slices 302 along range R, which may be called range planes. In some examples, a distance between illumination slices 302 show a range resolution that can be described by equation (2) below where c is the speed of light and B is a bandwidth of the transmitted optical signal 108. Thus, a higher bandwidth B creates a better range resolution. In some examples, the transmitted optical signal 108 includes one or more pulses and thus the narrower the pulses the better the range resolution.

$$\text{Range Resolution} = \frac{c}{2B} \quad (2)$$

Besides selecting a narrower pulse to improve the range resolution, a chirp with changing frequency may also increase bandwidth B and improve range resolution.

Figure 3B:
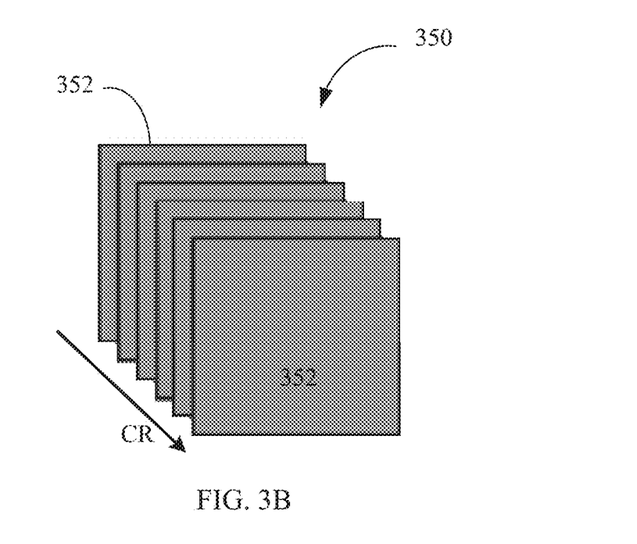
FIG. 3B illustrates a diagram of example cross-range illumination slices generated by imaging system of FIG. 1, according to some aspects of the disclosure.

FIG. 3B illustrates a diagram of an example cross-range illumination slices generated by imaging system of FIG. 1, according to some aspects of the disclosure. Diagram 350 shows illumination slices 352 along cross-range CR, which may be called cross-range planes. In some examples, a distance between illumination slices 352 shows a cross-range resolution that can be described by equation (3) below. In equation (3), lambda is a wavelength of the carrier frequency, r is range distance 116 between imaging platform 102 and illuminated spot 114, and Deff is an effective diameter of the synthetic aperture in CR direction. Thus, a higher effective diameter Deff generates a better cross-range resolution.

$$\text{Cross} - \text{Range Resolution} = \frac{lambda \cdot r}{2D_{\textit{eff}}} \quad (3)$$

As described, synthetic aperture module 226 may process consecutive received reflected signals 110 at one of apertures 104 and 106 to create a synthetic aperture with effective diameter Deff>D in the CR direction.

As described, two-dimensional phase difference P may be determined from received reflected signals 110 in the range direction while imaging platform 102 is moving in the cross-range direction. In some embodiments, transmitted optical signal 108 is a coherent signal and received reflected signals 110 at apertures 104 and 106 are also coherent signals. As imaging platform 102 moves in the cross-range direction, a two-dimensional complex-valued phasor (amplitude and phase) may be determined from each one of received reflected signals 110 at apertures 104 and 106. The two-dimensional complex-valued phasors may be combined, e.g., subtracted, to determine the two-dimensional phase difference P between complex-valued phasors. In some embodiments, the two-dimensional phase difference P is used to generate a two-dimensional image of height H, which may be viewed as a three-dimensional map.

Figure 4A:
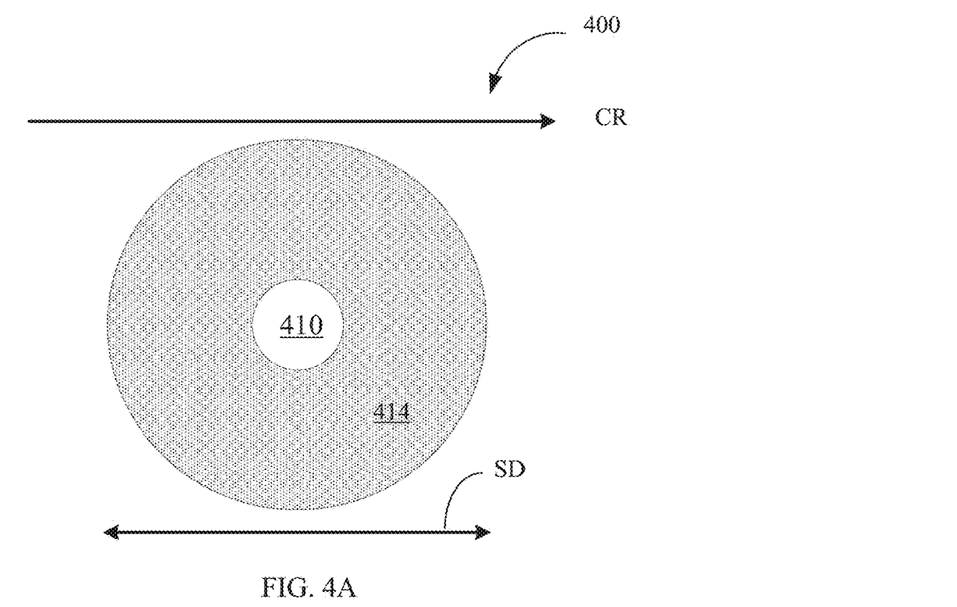
FIG. 4A illustrates a diagram of an example illumination spot of an imaging system at a range distance, according to some aspects of the disclosure.

FIG. 4A illustrates a diagram of an example illumination spot of an imaging system at a range distance, according to some aspects of the disclosure. Diagram 400 shows cross-range direction, CR, where an imaging platform such as imaging platform 102 of FIG. 1 that includes apertures 104 and 106 is moving along CR direction. Diagram 400 also shows illumination spot 414 that is consistent with illuminated spot 114 of FIG. 1 that illuminates target point 410 in a target object consistent with target object 112 of FIG. 1. Diagram 400 further shows a diameter SD of illumination spot 414 along CR direction.

Figure 4B:
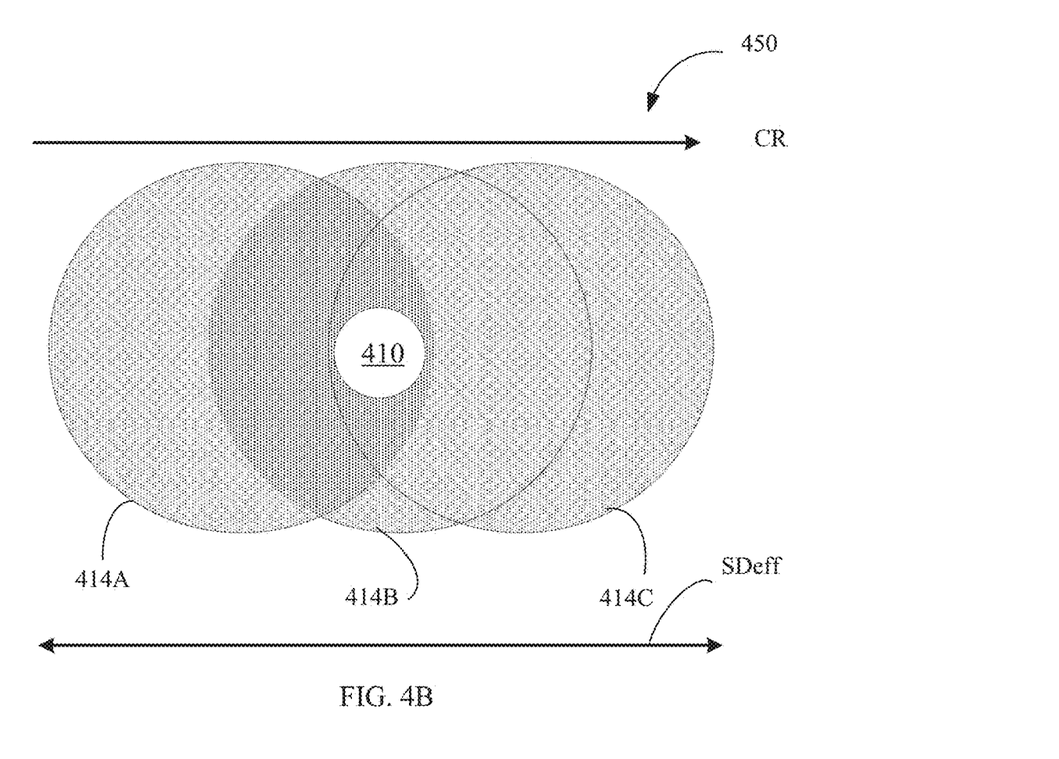
FIG. 4B illustrates a diagram of an example effective illumination spot of an imaging system at a range distance, according to some aspects of the disclosure.

FIG. 4B illustrates a diagram of an example effective illumination spot of an imaging system at a range distance, according to some aspects of the disclosure. Diagram 450 shows CR direction where a platform such as imaging platform 102 of FIG. 1 that includes apertures 104 and 106 is moving along CR. Diagram 450 shows target point 410 being consecutively illuminated by illuminations spots 414A, 414B, and 414C, while the imaging platform is moving along CR. As shown, in some examples, illumination spot is being extended by movement of imaging platform 102 along CR, creating an effective illumination spot with diameter SDeff longer than diameter SD of illumination spot 414. In some examples, longer diameter SDeff of illumination spot causes a synthetic aperture with longer effective aperture diameter.

As described, a longer diameter SDeff of the illumination spot in CR direction corresponds to a longer effective aperture diameter Deff in CR direction and thus causes a better CR resolution according to equation (3). The velocity of moving imaging platform 102 along CR direction may be either uniform or non-uniform. In some embodiments, calculation module 216 keeps track of the velocity of moving imaging platform 102 along CR direction and constructs Deff based on the velocity.

Figure 5A:
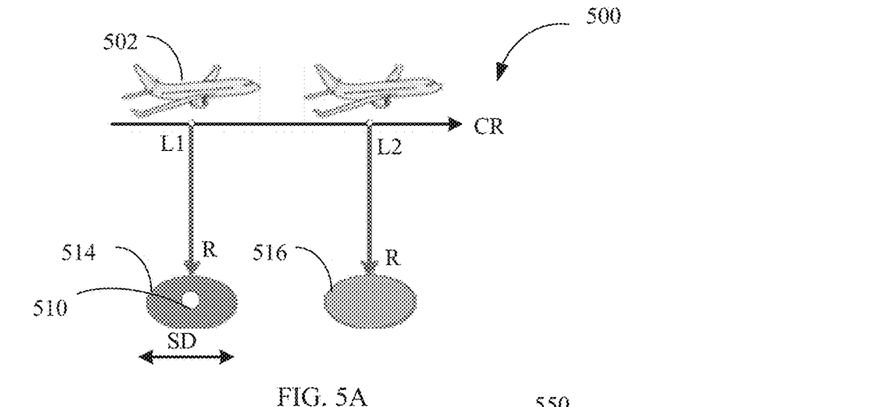
FIG. 5A illustrates a diagram of an example illumination spot of an imaging system in strip map mode, according to some aspects of the disclosure.

FIG. 5A illustrates a diagram of an example illumination spot of an imaging system in strip map mode, according to some aspects of the disclosure. Diagram 500 shows airplane 502 that is carrying an imagine platform such as imaging platform 102 of FIG. 1 that is moving along CR from location L1 to location L2. Diagram 500 shows that while the imaging platform is moving from location L1 to location L2, the illumination spot generated by transmitted optical signal 108 is moving from illumination spot 514 to illumination spot 516. Illumination spot 514 may include target point 510 but illumination spot 516 may not include target point 510. In some embodiments, illumination spot 514 has diameter SD in CR direction. In some examples, in strip map mode, illumination spot 514 moves in parallel to imaging platform 102 with a same speed as airplane 502. As described, imaging platform 102 may repeatedly transmit optical signals 108 and thus may repeatedly illuminate illumination spot 514 while illumination spot 514 moves over target point 510. Therefore, as described, consecutive received reflected signals 110 in a duration that illumination spot 514 covers target point 510 may be processed by synthetic aperture module 226 to create a synthetic aperture with effective diameter Deff1 larger than D.

Figure 5B:
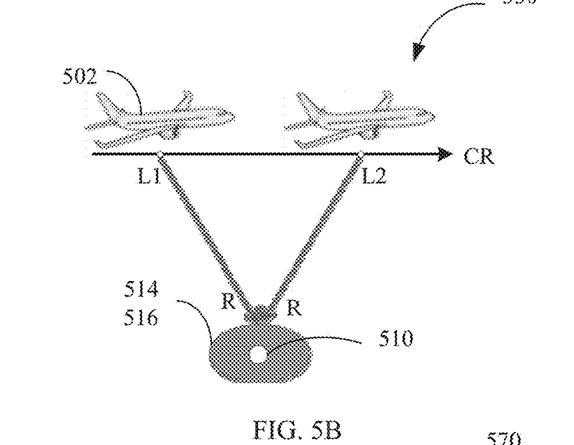
FIG. 5B illustrates a diagram of an example illumination spot of an imaging system in spotlight mode, according to some aspects of the disclosure.

FIG. 5B illustrates a diagram of an example illumination spot of an imaging system in spotlight mode, according to some aspects of the disclosure. Diagram 550 shows airplane 502 that is carrying an imaging platform such as imaging platform 102 of FIG. 1 that is moving along CR from location L1 to location L2. Diagram 550 shows that while the platform is moving from location L1 to location L2, the illumination spot generated by transmitted optical signal 108 may stay at illumination spot 514 that includes target point 510. In in spotlight mode, illumination spots 514 and 516 may coincide. As described, imaging platform 102 may repeatedly transmit optical signals 108 and thus may repeatedly illuminate illumination spot 514 while illumination spot 514 stays on target point 510. Therefore, consecutive received reflected signals 110 in a duration that illumination spot 514 stays on target point 510 may be processed to create a synthetic aperture with effective diameter Deff2 larger than Deff1. In some examples in spotlight mode, transmitted optical signal 108 stays pointing to target point 510 until a predefined effective length Deff2 of synthetic aperture is achieved and then illumination spot 514 moves to another target point.

Figure 5C:
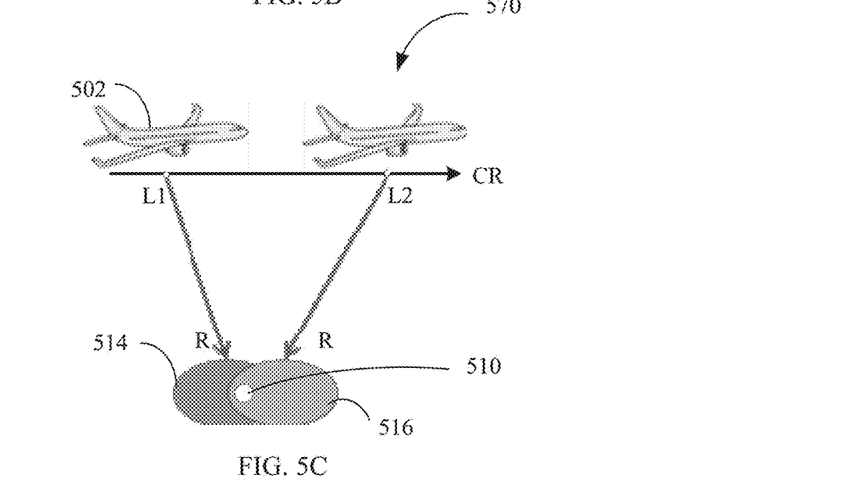
FIG. 5C illustrates a diagram of an example illumination spot of an imaging system in hybrid mode, according to some aspects of the disclosure.

FIG. 5C illustrates a diagram of an example illumination spot of an imaging system in hybrid mode, according to some aspects of the disclosure. Diagram 570 shows airplane 502 that is carrying an imaging platform such as imaging platform 102 of FIG. 1 is moving along CR from location L1 to location L2. Diagram 570 shows that while the platform is moving from location L1 to location L2, the illumination spot generated by transmitted optical signal 108 may move slower than imaging platform 102. In some examples, illumination spot 514 that includes target point 510 moves to illumination spot 516 that also includes target point 510. As described, imaging platform 102 may repeatedly transmit optical signals 108 and thus may repeatedly illuminate target point 510. Thus, as described, consecutive received reflected signals 110 in a duration that illumination spot 514 covers target point 510 may be processed to create a synthetic aperture with effective diameter Deff3 larger than D such that Deff2>Deff3>Deff1.

Figure 6A:
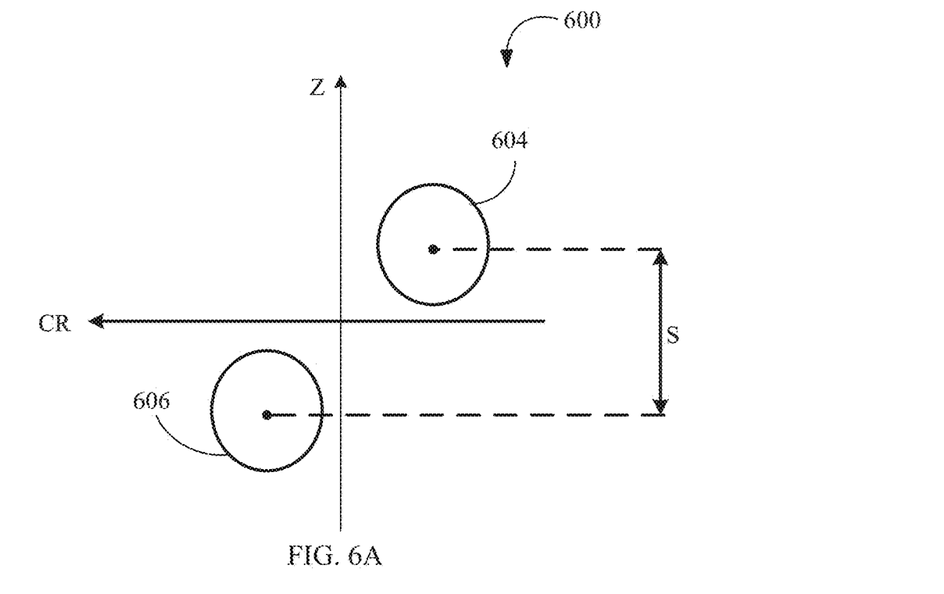
FIG. 6A illustrates a diagram of an example imaging platform of an imaging system, according to some aspects of the disclosure.

FIG. 6A illustrates a diagram of an example imaging platform of an imaging system, according to some aspects of the disclosure. Imaging platform 600 that is consistent with imaging platform 102 of FIG. 1 includes two circular apertures 604 and 606 with diameters D and with a separation distance S in Z direction between the centers of apertures 604 and 606. Imaging platform 600 shows that apertures 604 and 606 are not vertically stacked and there is a distance between the centers along the cross-range direction. However, separation distance S that separates the centers along Z direction is the parameter that is used for resolving the height of the target object according to equation (1). In some examples, apertures 604 and 606 may be circular but may not have a same diameter. In some examples, apertures 604 and 606 may not be circular or even may not have a same shape.

Figure 6B:
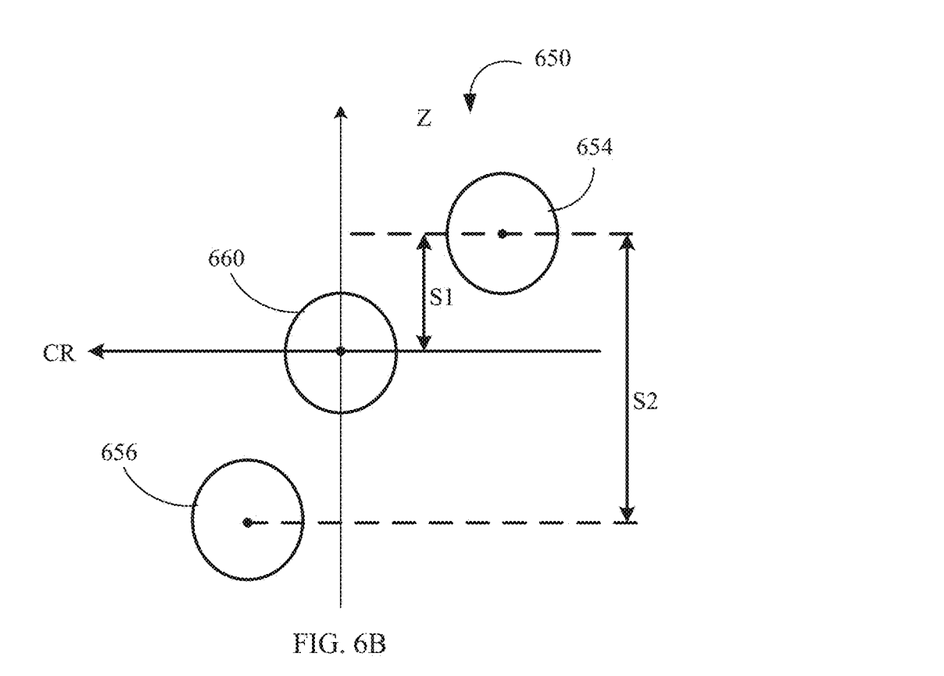
FIG. 6B illustrates a diagram of an example imaging platform of an imaging system, according to some aspects of the disclosure.

FIG. 6B illustrates a diagram of an example imaging platform of an imaging system, according to some aspects of the disclosure. Imaging platform 650 that is consistent with imaging platform 102 of FIG. 1 includes three circular apertures 654, 656, and 660 with diameters D. In some embodiments, one of the apertures, e.g., aperture 660 transmits optical signal 108, and other apertures, e.g., apertures 654 and 656, receive reflected signal 110 and therefore separation distance S1 may be used to calculate the height of a target object and to resolve Z direction.

In some embodiments, one of the apertures, e.g., aperture 654 transmits optical signal 108 and other apertures, e.g., apertures 654, 656, and 660, receive reflected signal 110. Therefore, because reflected signal 110 is received by three apertures 654, 656, and 660, three phase differences between the received reflected signals of three apertures 654, 656, and 660 may be calculated and height H may be determined based on the three phase differences according to equation (1).

In some embodiments two separation distances between apertures 654, 656, and 660, e.g., separation distances S1 and S2, may be used to resolve Z direction. In some examples, larger separation distance S2 provides higher precision and thus provides more accurate height calculations than smaller separation distance S1 provides. The smaller separation distance S1 may help with phase wrapping ambiguity and may resolve 2π phase ambiguities caused by separation distance S2. In some embodiments, apertures having larger separation distance S2 are used to generate a three-dimensional map with high precision heights and apertures having smaller separation distance S1 are used to resolve 2π phase ambiguities of the generated map.

In some embodiments, each one of the apertures of imaging platform 102 of FIG. 1 or each one the apertures of imaging platforms 600 and 650 of FIGS. 6A and 6B are coupled to a lens. The optical signal that is received by each one of the apertures may be focused by the lens on a detector such as signal detector 208 associated with the aperture. In response to the received optical signal, the detector may create an electrical signal. In some examples, signal detector 208 includes multiple detectors, e.g., signal detector 208 is an array detector. In some examples, signal detector 208 is a single pixel detector, a one-dimensional array detector, or a two-dimensional array detector. In some embodiments, the imaging platform has two apertures with a lens associated with each one of the apertures. The lenses may focus received reflected signal 110 through each one of the apertures as an image on the two array detector associated with the two apertures. Calculation module 216 may detect phase differences P between corresponding pixels of the two array detectors as indications of height H at different cross-range location.

In some embodiments, an imaging platform, e.g., of imaging platform 102, includes four or more apertures such that at least two of the four or more apertures are separated from the other apertures in the cross-range direction by more than one meter such that imaging platform can generates multiple views of target objects from different viewing angles.

Figure 7:
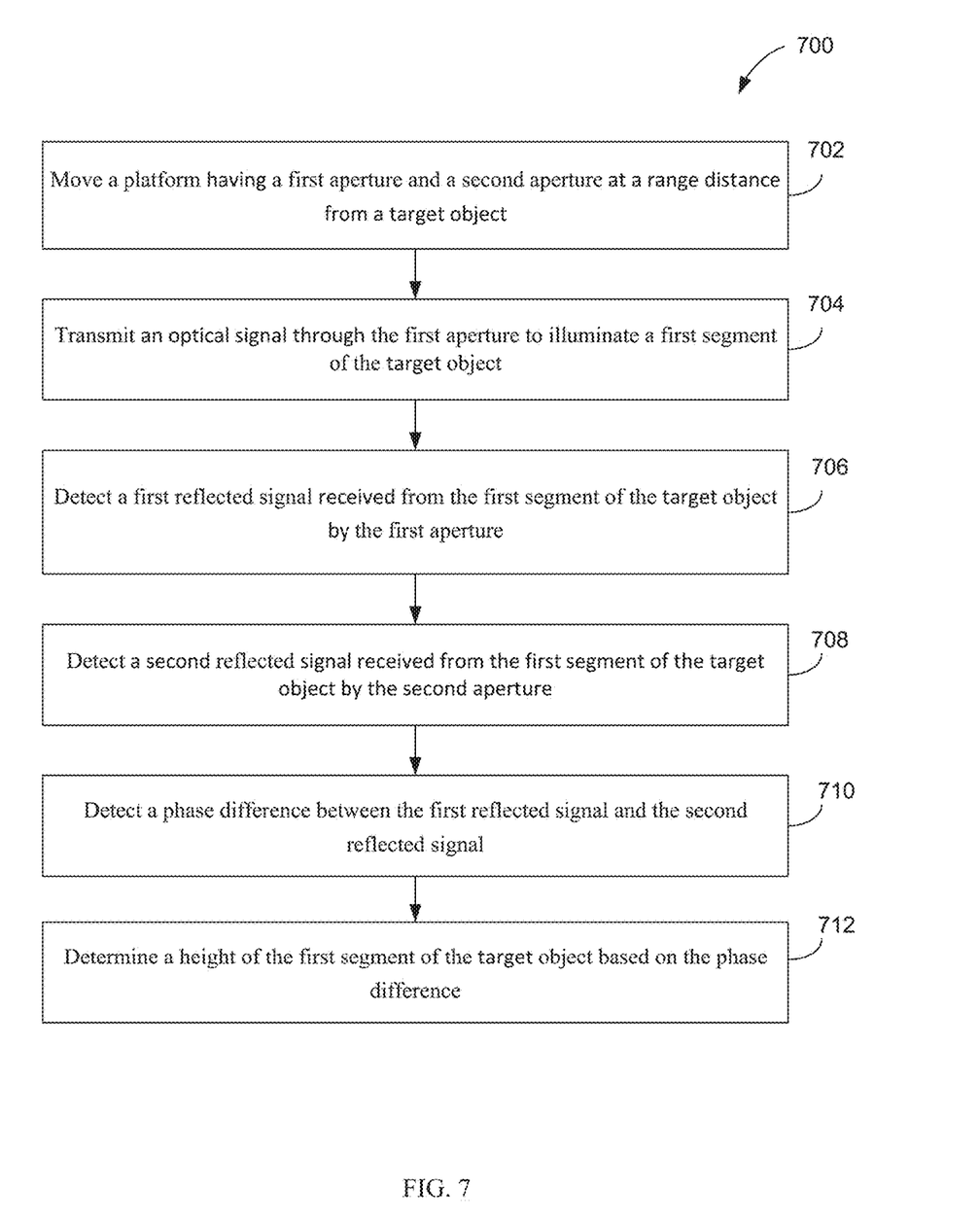
FIG. 7 illustrates a flow diagram of an example method of operation of an imaging system using synthetic aperture, according to some aspects of the disclosure.

FIG. 7 illustrates a flow diagram of an example method of operation of an optical imaging system using synthetic aperture, according to some aspects of the disclosure. Notably, one or more steps of method 700 described herein may be omitted, performed in a different sequence, and/or combined with other methods for various types of applications contemplated herein. Method 700 can be performed using imaging system 200 of FIG. 2 with imaging configuration 100 of FIG. 1.

As show in FIG. 7, at step 702, a platform having a first aperture and a second aperture is moved at a range distance from a target object. In some examples as shown in FIG. 1, imaging platform 102 that includes first aperture 104 and second aperture 106 is moved, e.g., translated, along cross-rang direction, CR. Imaging platform 102 is located at range distance 116 along range direction, R, from target object 112. In some embodiments, imaging platform 102 is on board airplane 502 of FIG. 5 and is moved over target object 112 by airplane 502. Range direction, R, is along a line connecting airplane 502 to target object 112. Imaging platform 102 is moved along CR direction while keeping range distance 116 from target object 112 and consequently, illuminated spot 114 is moved on target object 112 along CR direction. Referring back to FIG. 4B, illumination spots 414A, 414B, and 414C are examples of moving an illumination spot on a target object. In some examples as shown in FIG. 1, range direction is perpendicular to cross-range direction. In some embodiments, first and second apertures 104 and 106 are separated in Z direction perpendicular to R and CR directions.

At step 704, an optical signal is transmitted through the first aperture to illuminate the target object. In some examples, as shown in FIG. 1, optical signal 108 is transmitted through aperture 104 along R direction toward target object 112. Optical signal 108 illuminates target object 112 and create illumination spot 114. As described, optical signal 108 may be generated by transmitter 222 of FIG. 2 based on signal source 224 that may be a laser source.

At step 706, a first reflected signal received from the target object by the first aperture is detected. In some embodiments and referring to FIG. 1, in response to optical signal 108 illuminating target object 112, reflected signal 110 is transmitted off target object 112. A first portion of reflected signal 110 after reaching imaging platform 102 may go through aperture 104. In some embodiments and referring to FIG. 2, the first portion of reflected signal 110 that may be called the first reflected signal is received by receiver 204 and is detected by signal detector 208. In some examples, the detected first portion of reflected signal 110 may be sampled by signal sampler 206 and may be digitized by ADC 218.

At step 708, a second reflected signal received from the target object by the second aperture is detected. In some embodiments and referring to FIG. 1, a second portion of reflected signal 110 after reaching imaging platform 102 may go through aperture 106. In some embodiments and referring to FIG. 2, the second portion of reflected signal 110 that may be called the second reflected signal is received by receiver 204 and is detected by signal detector 208. In some examples, the detected second portion of reflected signal 110 may be sampled by signal sampler 206 and be digitized by ADC 218.

At step 710, a phase difference between the first reflected signal and the second reflected signal is detected. In some embodiments and referring to FIG. 2, calculation module 216 of imaging system 200 may compare the detected and then sampled first portion of reflected signal 110 and second portion of reflected signal 110 and may detect phase difference P between first portion of reflected signal 110 and second portion of reflected signal 110.

At step 712, a height of the target object is determined based on the phase difference. In some embodiments and referring to FIGS. 1 and 2, calculation module 216 of imaging system 200 may determine height H of target object 112 based on equation (1) using detected phase difference P and range distance 116. In some examples and referring to FIGS. 3A and 3B, the intersection of range planes and cross-range planes defines a line in Z direction. Phase difference P may correspond to a height along the intersection line. In some examples, height H that is determined based on phase difference P is height H of illumination spot 114 along the intersection line.

In some examples, when imaging platform 102 is at a first location along CR direction, first optical signal 108, e.g., an optical pulse, is transmitted through one of apertures 104 or 106, e.g., aperture 106. First optical signal 108 is transmitted along R direction toward target object 112. In response to the transmitted first optical signal 108, first reflected signal 110 is reflected back from first illumination spot 114 on target object 112. First reflected signal 110 is received by apertures 104 and 106 of imaging platform 102. A first portion of first reflected signal 110 may go through aperture 104 and a second portion of first reflected signal 110 may go through aperture 106. Height H of first illumination spot 114 may be determined based on the first and second portions of first reflected signal 110. Imaging platform 102 may move to a second location along CR direction and second optical signal 108 may be transmitted through aperture 106. In response to the transmitted second optical signal 108, a first portion of second reflected signal 110 may go through aperture 104, and a second portion of second reflected signal 110 may go through aperture 106. Height H of second illumination spot 114 may be determined based on the first and second portions of second reflected signal 110. Thus, by moving imaging platform 102 along CR direction, illumination spot 114 is also moved on target object 112 along CR direction. In addition, height H of target object 112 may be determined at multiple locations along CR direction.

In some embodiments, two-dimensional images are created by receiving reflected signals 110 in the range direction while imaging platform 102 is moving in the cross-range direction. Additionally, by receiving reflected signals 110 by first and second apertures 104 and 106, imaging system 200 may resolve the vertical extent of target object 112 and may create a three-dimensional image.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. An imaging system comprising:
    an imaging platform comprising two or more apertures including a first aperture and a second aperture, wherein the first and second apertures are separated by a first separation distance in a predefined direction;
    a transmitter device coupled to the first aperture and configured to transmit an optical signal via the first aperture in a first direction perpendicular to the predefined direction;
    a first receiver device coupled to the first aperture and configured to receive, via the first aperture, a first reflected signal in the first direction from a target object at a range distance based on the transmitted optical signal;
    a second receiver device coupled to the second aperture and configured to receive, via the second aperture, a second reflected signal in the first direction from the target object based on the transmitted optical signal; and
    a processor unit configured to determine a first phase difference between the received first reflected signal and the received second reflected signal, wherein the processor unit is further configured to determine a first estimate of a height of the target object in the predefined direction based on the first phase difference and the range distance.

2. The imaging system of claim 1, wherein the imaging platform is configured to be moved in a second direction perpendicular to the first direction and the predefined direction, and wherein the imaging platform is moved in a stripmap mode, a spot light mode, or a combination thereof.

3. The imaging system of claim 1, wherein the imaging platform comprises a third aperture separated by a second separation distance in the predefined direction from the first aperture, wherein the transmitter device is coupled to the third aperture and is configured to transmit the optical signal via the third aperture in the first direction.

4. The imaging system of claim 3, further comprising:
    a third receiver device coupled to the third aperture and configured to receive a third reflected signal from the target object based on the transmitted optical signal; and
    wherein the processor unit is further configured to determine a second phase difference between the first reflected signal and the third reflected signal, wherein the processor unit is further configured to determine a second estimate of the height of the target object based on the second phase difference and the range distance.

5. The imaging system of claim 4, wherein the second separation distance is smaller than the first separation distance, wherein the first estimate of the height is more accurate than the second estimate of the height, and wherein, based on phase wrapping, the second estimate of the height is less ambiguous than the first estimate of the height.

6. The imaging system of claim 1, further comprising:
    a signal detector coupled to the first receiver device and the second receiver device and configured to detect the first reflected signal and the second reflected signal;
    a signal sampler coupled to the signal detector and configured to sample and digitize the detected first reflected signal and the second reflected signal; and
    a calculation module of the processor unit is configured to determine the first phase difference based on the sampled and digitized first and second reflected signals.

7. The imaging system of claim 6, wherein the transmitted optical signal is a coherent optical signal,
    wherein the signal sampler is further coupled to the transmitter device and is configured to sample and digitize the optical signal, wherein the signal sampler is further configured to store the digitized optical signal in a memory associated with the imaging system, wherein the imaging system further comprising:

a waveform correction module of the processor unit configured to apply a correction to the first reflected signal and the second reflected signal based on the stored optical signal to increase a coherence time of the first reflected signal and the second reflected signal.

8. The imaging system of claim 1, wherein the transmitted optical signal and the first and second reflected signals are coherent optical signals.

9. The imaging system of claim 1, wherein the transmitted optical signal is a laser pulse.

10. A method of imaging, comprising:
moving an imaging platform comprising two or more apertures in a first direction at a range distance from a target object, wherein the first direction is perpendicular to a second direction connecting the imaging platform to the target object, and wherein the imaging platform includes a first aperture and a second aperture that are separated by a first separation distance in a third direction perpendicular to the first and second directions;
transmitting an optical signal through the first aperture in the second direction to illuminate the target object;
detecting a first reflected signal, received based on the optical signal, from the target object by the first aperture;
detecting a second reflected signal, received based on the optical signal, from the target object by the second aperture;
determining a first phase difference between the first reflected signal and the second reflected signal; and
determining a first estimate of a height of the target object in the third direction based on the first phase difference and the range distance.

11. The method of claim 10, further comprising:
moving the imaging platform in a stripmap mode, a spot light mode, or a combination thereof;
transmitting a plurality of optical signals while moving;
sampling the detected first and second reflected signals that are based on the plurality of optical signals to create a two dimensional image in the first and second directions; and
determining a height in the third direction to create a three dimensional image.

12. The method of claim 10, wherein the imaging platform includes a third aperture separated by a second separation distance in the third direction from the first aperture.

13. The method of claim 12, further comprising:
detecting a third reflected signal, received based on the optical signal, from the target object by the third aperture;
determining a second phase difference between the first reflected signal and the third reflected signal; and
determining a second estimate of the height of the target object based on the second phase difference and the range distance.

14. The method of claim 13, wherein the second separation distance is smaller than the first separation distance, the method further comprising:
resolving a phase wrapping ambiguity of the first phase difference based at least on the second phase difference.

15. The method of claim 10, wherein the optical signal is a coherent optical signal, the method further comprising:
receiving the transmitted optical signal;
applying a phase correction to the first reflected signal based on the optical signal and a round trip time to extend a coherence time the optical signal, wherein the round trip time is a length of time from an instance the optical signal is transmitted until the first reflected signal is received; and
applying the phase correction to the second reflected signal.

16. The method of claim 10, wherein the optical signal is a coherent optical pulse.

17. A method of imaging, comprising:
detecting a first portion of an optical signal reflected from an object and received through a first aperture;
detecting a second portion of the optical signal reflected from the object and received through a second aperture, wherein the first aperture and the second aperture are arranged in an imaging platform,
wherein the optical signal is received from a first direction connecting the object to the imaging platform, and wherein the first aperture and the second aperture are separated by a first separation distance in a second direction perpendicular to the first direction;
determining a first phase difference between the detected first portion of the optical signal and the detected second portion of the optical signal; and
determining a first estimate of a height of the object in the second direction based on the first phase difference.

18. The method of claim 17, wherein the determining the first estimate of the height of the object is additionally based on a range distance in the first direction between the imaging platform and the object.

19. The method of claim 17, wherein the optical signal reflected from the object is coherent optical signal.

20. The method of claim 17, further comprising:
detecting a third portion of the optical signal reflected from the object and received through a third aperture of the imaging platform separated by a second separation distance smaller than the first separation distance in the second direction from the first aperture;
determining a second phase difference between the detected first portion of the optical signal and the detected third portion of the optical signal; and
resolving a phase wrapping ambiguity of the first phase difference based at least on the second phase difference.

* * * * *